F. J. Kaldenberg,
Pipe.
No. 90,554. Patented May 25, 1869.
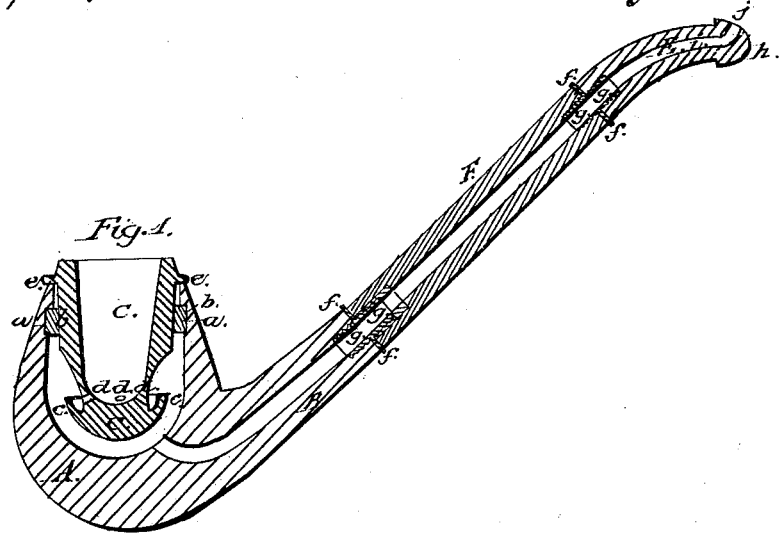
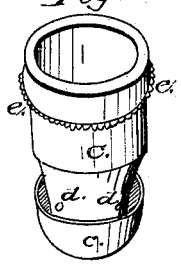
Witnesses:
Alex. A. C. Klaucke.
Jos. H. Thies.
Inventor:
Frederick J. Kaldenberg

United States Patent Office.

FREDERICK J. KALDENBERG, OF NEW YORK, N. Y.

Letters Patent No. 90,554, dated May 25, 1869.

IMPROVEMENT IN SMOKING-PIPES.

The Schedule referred to in these Letters Patent and making part of the same.

*To all whom it may concern:*

Be it known that I, FREDERICK J. KALDENBERG, of the city, county, and State of New York, have invented a new and useful Improvement in Smoking-Pipes; and I do hereby declare the following to be a full and correct description of the same, sufficient to enable others skilled in the art to which my invention appertains to fully understand and construct the same, reference being had to the accompanying drawings, which make part of this specification, and in which—

Figure 1 is a longitudinal vertical section of my improvement in pipes;

Figure 2 is a detached perspective view of the tobacco-cup; and

Figure 3 is a detached view of the attachment by means of which the stem is secured to the pipe.

Like letters of reference indicate like parts in the several figures.

The nature of my invention consists—

First, in applying to a meerschaum pipe, the material of which has been properly prepared, a cup to contain the tobacco, and made of meerschaum in its natural state, which cup is held in the bowl of the pipe in such a manner as not to touch the inside of the bowl, but leave a free space between them.

Secondly, in providing the said tobacco-cup, at its lower end, with a saucer-shaped extension, to catch and retain all moisture escaping from the tobacco, and preventing it from coming into contact with the inside of the bowl.

A, in the drawings, represents the bowl of a meerschaum pipe, which has been properly boiled, or otherwise prepared, in the usual manner, and B, its shank.

On the inside of the bowl, near its top, is formed a rebate, $a$, in which rests a ring, $b$, of cork, or any other substance non-conductor of heat.

This ring $b$ serves to hold in place a cup, C, constructed of meerschaum, in its natural state, with converging sides, and ending at its lower end in a saucer, $c$, into which the holes $d$ lead from the inside of the cup.

A shoulder, $e$, is formed near the top, on the outside of this cup, which shoulder rests on the rim of the bowl A.

Between the converging sides of the cup and the inside of the bowl a space, D, is thus formed, through which the smoke passes when the pipe is in use.

In fig. 3, I have shown the attachment which connects the stem or mouth-piece to the shank of the bowl.

It consists of a disk, $f$, through which passes a short tube, $g$, having a screw-thread cut or otherwise formed on its outer surface.

One end of the tube $g$ is screwed into the shank of the pipe until the disk $f$ bears against it, while the stem or mouth-piece is screwed into its other end.

By applying several of these attachments, any desired number of extensions of the stem may be made.

The disk $f$ may be made of a little larger diameter than that of the stem, mouth-piece, or shank of the pipe, so as to project a little beyond the same; thus a protection is afforded against the breaking of the edges of the shank.

In coloring meerschaum pipes, it is requisite to prevent all moisture from reaching the parts to be colored, for if such moisture permeates the meerschaum, it not only clogs up the pores through which the nicotinous smoke ought to permeate the pipe, but also rots the meerschaum, rendering it brittle and worthless.

To prevent this is the object of this part of my invention.

The cup C being made of meerschaum in its natural and very porous condition, absorbs the moisture of the tobacco before it has reached the bowl, and if any of it is not thus absorbed, it necessarily finds its way into the saucer $c$, where, by the heat of the cup, it is soon dried up, if not absorbed; and when the saucer is filled the cup may be removed from the bowl, cleansed, and replaced.

The ring $b$ prevents any contact of the cup with the bowl, so that nothing but the hot, dry smoke is allowed to fill the space D.

E represents the mouth-piece of the pipe, shown as attached to the extension F, although it may be attached directly to the shank B.

It is, as usual, hollow, but the channel $i$, instead of passing directly out at the end of the point $h$, turns upwardly, as shown at $j$, and thus brings the opening to the upper side of the point, instead of to its end.

The opening being in this position, the hot smoke escapes upwardly into the mouth of the smoker, and does not, as is so frequently the case, especially with short pipes, burn the tongue, while the saliva, collecting at the lower part of the mouth, is not so apt to flow into the pipe, and the opening being located in the point, and not beyond it, on the mouth-piece, the lips or teeth of the smoker, in holding the mouth-piece between them, cannot close the opening.

Having thus described my invention,

What I claim as new therein, and desire to secure by Letters Patent, is—

1. The cup C, when constructed of meerschaum in its natural state, and applied to the bowl of a meerschaum pipe, to operate substantially in the manner described.

2. The cup C, when provided with a saucer, $c$, and openings $d$, leading into the saucer, arranged to operate as and for the purpose described.

FREDERICK J. KALDENBERG.

Witnesses:
ALEXR. A. C. KLAUCKE,
JAS. H. THIES.